Oct. 16, 1956 D. L. ARENBERG 2,767,336
CEMENT FOR BONDING ELEMENTS OF A DELAY LINE WITH LOW TRANSMISSION LOSSES USING MIXTURES OF INORGANIC SALTS
Filed May 22, 1951
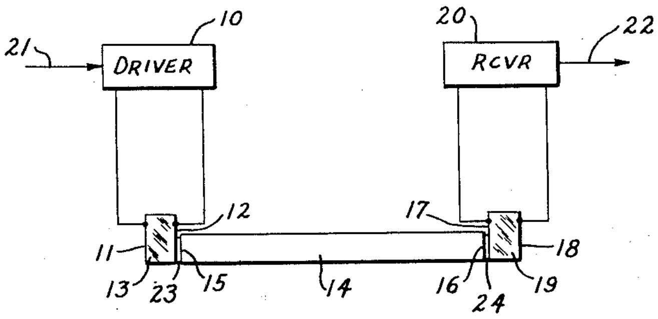
INVENTOR.
DAVID L. ARENBERG
BY
ATTORNEYS

United States Patent Office 2,767,336

Patented Oct. 16, 1956

2,767,336

CEMENT FOR BONDING ELEMENTS OF A DELAY LINE WITH LOW TRANSMISSION LOSSES USING MIXTURES OF INORGANIC SALTS

David L. Arenberg, Rochester, Mass.

Application May 22, 1951, Serial No. 227,590
3 Claims. (Cl. 310—8.3)

(Granted under Title 35, U. S. Code (1952), sec. 266)

The invention described herein may be manufactured and used by or for the Government of the United States of America for governmental purposes without the payment of any royalties thereon or therefor.

The present invention concerns a bonding agent for application to the surfaces of material such as the large matching surfaces of ultrasonic delay-line elements, and the invention also concerns the article formed by such elements and the bonding agent. In particular, the invention concerns such a bonding agent and article in which there is applied to the surfaces to be bonded a thin coat of a mixture of non-glass-forming inorganic salts, as exemplified by an eutectic mixture of $KNO_3$ and $NaNO_3$, followed by pressing of the surfaces against each other with the bonding agent heated slightly above its temperature of solidification, and then allowing the bonding agent to cool into solidified form.

In forming ultrasonic delay lines for electronic applications where it is desired to delay a signal for a short period of time, it is necessarry to bond together elements of the delay line such as a piezoelectric crystal and the transmission bar. Both the crystal and bar conveniently are made of glass-like material. For example, the crystal can be made of quartz and the bar can be made of glass. The surfaces to be bonded are conventionally prepared as large matching surfaces and a bonding agent applied thereto. To afford a good acoustical match between the bonding agent and the delay line elements, to provide for low loss by absorption or reflection of acoustic energy in the cement, and to provide for transmission of ultrasonics over a wide range of temperature it is necessary to have the cement layer of uniform thickness and preferably it is very thin, for example, of the order of .001 inch or less at 10–30 mc./sec.

One way of bonding quartz or glass surfaces to each other or to metals in the past, has been to use an organic cement or a type of solder. Cements with solvents do not form good bonds over large areas of impermeable material because they never dry out in the interior. Thermoplastic and thermosetting cements are usually so viscous that they do not form thin bonds. In addition organic cements do not match glass well acoustically and do not hold over a wide range of temperature.

The present invention overcomes these difficulties by providing for application to the surfaces to be bonded a thin coat of a mixture of non-glass forming inorganic salts, as exemplified by an eutectic mixture of $KNO_3$ and $NaNO_3$, followed by pressing of the surfaces against each other with the bonding agent heated slightly above its temperature of solidification, and then allowing the bonding agent to cool into solidified form. This provides a bond that has a good acoustical match between the elements being bonded and the bonding agent. The mixture of salts are chosen from those that adhere well to glass surfaces. No flux is required. The setting temperature is low. Losses in the cement of acoustic energy by absorption or reflection are low. Ultrasonics can be transmitted over a wide range of temperature.

Non-glass forming inorganic salts are desirable as a bond because of their low viscosity near the melting point.

An object of the invention is to provide a bonding agent for application to the surfaces of material such as delay-line material and the article formed by such elements and the bonding agent.

Another object is to provide a bonding agent for application to the matching surfaces of material in which the bonding agent is a mixture of non-glass-forming inorganic salts, as exemplified by an eutectic mixture of $KNO_3$ and $NaNO_3$.

Another object is to provide in a delay line a first element having a surface, a second element having a surface and a thin layer of bonding agent between the surfaces and holding the elements together, the bonding agent being a mixture of non-glass-forming inorganic salts, as exemplified by an eutectic mixture of $KNO_3$ and $NaNO_3$.

Other objects and many of the attendant advantages of this invention will be readily appreciated as the same becomes better understood by reference to the following detailed description when considered in connection with the accompanying drawing wherein:

The single figure is a schematic diagram in block form of the present invention.

In the drawing, the driver circuit 10 is connected to faces 11 and 12 of a piezoelectric crystal 13. Piezoelectric crystal 13 is mounted at one end 15 of a bar 14 of transmission material, and a second piezoelectric crystal 19 is located at the other end 16 of bar 14. The two faces 17 and 18 of crystal 19 are connected to a receiver circuit 20. An input connection 21 to driver circuit 10 provides means for applying a signal to be delayed to circuit 10 and an output connection 22 from receiver 20 provides the delayed signal. Connections 21 and 22 may be connected in any circuit where a signal is to be delayed. Piezoelectric crystals 13 and 19 are mounted on transmission bar 14 by means of bonds 23 and 24, respectively, that are shown in exaggerated thickness for illustration and that are formed in the following manner.

The surfaces to be bonded for example, crystal surface 12 and bar surface 15, are cleaned and arranged in proper position relative to each other. The bonding agent, in molten condition, is applied by any convenient means. One method is to melt the bonding agent in close proximity to the joint and the molten bonding agent is caused to flow by capillary action into the joint and to unite the parts to be joined.

Other methods of applying a bonding agent can also be employed. For example, one or both of the surfaces to be joined can be coated with a thin film of the bonding agent and the surfaces then heated to above melting temperature of the bonding agent, and at the same time be pressed together. When the parts have cooled sufficiently for the bonding agent to be solidified, the joint is completed.

The bonding agent is composed of a mixture of non-glass-forming inorganic salts having a desired low melting point and desired acoustical match with crystal 13 and bar 14. Salt mixtures can be composed using such salts as halides of alkali metals, for example, NaCl, KCl, LiF, or salts such as $AgNO_3$, $CdI_2$, AgCl, TlCl, TlBr, AgI, AgBr.

The proportions of the salts are chosen to provide the desired properties in the joint. Preferably there is used a mixture of $NaNO_3$ and $KNO_3$ in eutectic proportions.

The bond 23 is preferably very thin, being of the order of about .001 inch or less and is of uniform thickness over its entire area.

Obviously many modifications and variations of the present invention are possible in the light of the above teachings. It is therefore to be understood that within the scope of the appended claims the invention may be practiced otherwise than as specifically described.

I claim:

1. Ultrasonic energy transmitting apparatus comprising in combination, a crystal transducer, a solid acoustical delay line, and a layer of bonding agent disposed between and securing said transducer to said delay line, said bonding agent providing an acoustical match between said transducer and said delay line, said bonding agent consisting of a mixture of inorganic salts selected from the nitrates of the group consisting of potassium, sodium and silver.

2. A method for manufacturing a delay line of the type including pressure transducers and an acoustic transmission bar wherein said transducers and said bar have adjacent confronting surfaces, comprising the steps of, applying to said surfaces a thin coat of bonding agent consisting of a mixture of inorganic salts selected from the nitrates of the group consisting of potassium, sodium, and silver, said bonding agent being heated above its melting point when applied to said surfaces, and then cooling to solidify said bonding agent.

3. An improved method for manufacturing a delay line of the type including pressure transducers and an acoustic transmission bar wherein said transducers and said bar have adjacent confronting surfaces, comprising the steps of, applying to said surfaces a thin coat of bonding agent consisting of a mixture of $KNO_3$ and $NaNO_3$ while said bonding agent is heated above its melting point, and then cooling to solidify said bonding agent.

References Cited in the file of this patent

UNITED STATES PATENTS

| | | |
|---|---|---|
| 2,227,268 | Mason | Dec. 31, 1940 |
| 2,458,581 | Firestone et al. | Jan. 11, 1949 |
| 2,511,224 | Kuan-Han et al. | June 13, 1950 |
| 2,512,130 | Arenberg | June 20, 1950 |
| 2,589,403 | Kurie | Mar. 18, 1952 |
| 2,672,590 | McSkimin | Mar. 16, 1954 |

FOREIGN PATENTS

| | | |
|---|---|---|
| 585,663 | Great Britain | Feb. 18, 1947 |

OTHER REFERENCES

Chemical Society Journal, vol. 123, 1923, pp. 1608–1618 (Briscoe et al.), and pp. 2914–2916 (Madgin et al.), Freezing Point for Mixtures of Potassium and Sodium Nitrates, and Melting Point for Mixtures of Potassium and Sodium Nitrates, respectively.

Chemical Society Journal, part 2, July–December 1932, Proceedings, pp. 2582–2589 (Laybourn et al.), Ternary System Involving Nitrates.

Metz et al.: Electronics for July 1949, pp. 96–100.

Laybourn et al.: Transactions of the Faraday Society, vol. 28, pp. 857–866 (1932).

Procedures in Experimental Physics, by Strong et al. Prentice-Hall, Inc., New York, 1944.